United States Patent

Hung

[11] Patent Number: 5,851,417
[45] Date of Patent: *Dec. 22, 1998

[54] ELEMENTAL METALS, OXIDES, OR ALLOYS DISTRIBUTED ON A CARBON SUBSTRATE OR SELF-SUPPORTED AND PROCESS THEREFOR

[76] Inventor: Ching-Cheh Hung, 24667 Meadow La., Westlake, Ohio 44145

[ * ] Notice: The term of this patent shall not extend beyond the expiration date of Pat. No. 5,622,683.

[21] Appl. No.: 524,651

[22] Filed: Sep. 8, 1995

[51] Int. Cl.⁶ .................................................. C01B 31/00
[52] U.S. Cl. ............................... 252/62.55; 252/62.51 R; 423/414; 423/415.1; 423/448
[58] Field of Search .................... 264/81, 82; 423/445 R, 423/448, 414, 439, 415.1, 592; 502/174, 231; 252/62.51 R, 62.55

[56] References Cited

U.S. PATENT DOCUMENTS 4,795,624 1/1989 Nalewajek ............................. 423/439

OTHER PUBLICATIONS

C. C. Hung, *Fabrication of Iron–containing Carbon Materials from Graphite Fluoride*, Extended Abstracts and Program for the 22nd Biennial Conference on Carbon sponsored by the American Carbon Society, San Diego, CA, Jul. 16–21, 1995, pp. 656–657.

C. C. Hung, *Processes and Products of the Reactions Between Graphite Fluoride and a Few Selected Metal Halides*, Extended Abstracts and Program for the 22nd Biennial Conference on Carbon sponsored by the American Carbon Society, San Diego, CA, Jul. 16–21, 1995, pp. 664–665.

*Primary Examiner*—Michael L. Lewis
*Assistant Examiner*—Stuart L. Hendrickson
*Attorney, Agent, or Firm*—Donald A. Bergquist

[57] ABSTRACT

A plurality of processes for producing unique end products containing elemental metals or metal oxides on and in a carbon substrate, elemental metals or metal oxides in the absence of such a carbon substrate, mixtures of elemental metals or metal oxides on and in a carbon substrate, or mixtures of elemental metals or metal oxides in the absence of such a carbon substrate, all of which processes involve the preparation of a first-step intermediate product that is a carbonaceous material appearing to be non-graphitic by X-ray diffraction standards and containing metal and halogen, which intermediate product is made from graphite fluoride and an appropriate metal halide. Among the end products are aluminum oxide fibers, elemental iron fibers, magnetic carbon fibers containing either iron or an iron-nickel alloy, and carbon containing various metals in the form of elemental metal or oxides.

20 Claims, 2 Drawing Sheets

ELEMENTAL METALS, OXIDES, OR ALLOYS DISTRIBUTED ON A CARBON SUBSTRATE OR SELF-SUPPORTED AND PROCESS THEREFOR

ORIGIN OF THE INVENTION

The invention described herein was made by an employee of the U.S. Government and may be manufactured and used by or for the Government for governmental purposes without the payment of any royalties thereon or therefor.

INTRODUCTION

This invention relates to products of elemental metals, their oxides, or their alloys that may be self-supporting structures or structures distributed on (or within) a carbon substrate; it further deals with methods to produce such materials through the use of a method that generates an intermediate product that incorporates a metal, its fluoride, and a halogen within the structure of a carbonaceous material that may then be used in a plurality of secondary processes to produce a plurality of end products. More specifically, the unique products, which can be made with a variety of metals from their halides and employing graphite fluoride to generate an intermediate halogenated carbonaceous product incorporating the metals that is then dehalogenated to produce metals or metal oxides distributed on a carbon substrate. The carbon can also be oxidized away to result in a self-supporting lacy network of the metals or metal oxides. Whether or not they include the carbon substrate, the resulting materials, having high specific surface area (i.e., having a large area of exposed surface per gram of product), are expected to find use as catalysts, in batteries, in carbon-matrix composites, or, when the metal used includes iron, cobalt, or nickel, in the production of a magnetic material.

PRIOR ART

Prior work relating to this invention is presented in a co-pending application for U.S. patent, application Ser. No. 08/258,961, CHEMICALLY MODIFIED CARBONACEOUS MATERIALS MADE BY THE DEFLUORINATION OF GRAPHITE FLUORIDE AND PROCESS THEREFOR, filed Jun. 13, 1994, which is incorporated herein by reference. The following are seen as differences between this disclosure and that of the previous application:

a. the prior disclosure teaches only one chloride reactant, $FeCl_3$;

b. the prior disclosure teaches the producing of iron oxides in or on a carbon substrate, whereas this disclosure teaches the producing of oxides, pure metals or alloys, either in or on carbon, or even without the presence of carbon in the end product;

c. the prior disclosure teaches heating the intercalated intermediate product (i.e., the product of the $FeCl_3$ and $CF_x$ reaction) in an "inert" environment, whereas this disclosure includes steps to supply extra oxygen to allow complete oxidation of the metals, thereby resulting in higher metal or alloy concentrations.

Applicant is aware of no prior art closely related to the present invention, other than his own publications.

SUMMARY OF THE INVENTION

It is an object of this invention to provide a method for producing a variety of materials from a graphite fluoride starting material in either a fibrous or a powdered form and at least one metal halide, which materials produced contain residual metal from said halide in the form of the elemental metal, or oxides thereof, which product residual metal is in or on a carbonaceous substrate remaining from said graphite fluoride, or which product residual metal is present in the absence of any carbon.

It is also an object of this invention to provide a method for producing from graphite fluoride and a metal halide a first-stage intermediate product in which the metal halide has entered into and altered the laminar crystal structure typical of said graphite fluoride, thereby resulting in a carbonaceous material appearing to be non-graphitic by X-ray diffraction standards and containing said first metal, its fluoride, and said halogen, which material is useful as an intermediate in a plurality of processes.

It is also an object of this invention to provide a method for producing from such a first-stage intermediate product an end product that is the oxide of metal from the metal halide used to make the intermediate product and said end product contains substantially no carbon.

It is also an object of this invention to provide a method for producing from such a first-stage intermediate product an end product that is the oxide of metal from the metal halide used to make the intermediate product and said end product contains carbon.

It is also an object of this invention to provide a method for producing from such a first-stage intermediate product an end product that is a carbonaceous product containing metal from the metal halide used to make the intermediate product.

It is also an object of this invention to provide a method for producing from such a first-stage intermediate product an end product that is the metal from the metal halide used to make the intermediate product and said end product contains substantially no carbon.

It is also an object of this invention to provide a method for producing from such a first-stage intermediate product an end product that is the metal from the metal halide used to make the intermediate product and a second metal that is merely placed adjacent the reacting intermediate product.

It is also an object of this invention to provide a method for producing from such a first-stage intermediate product an end product that is an oxide of the metal from the metal halide used to make the intermediate product and an oxide of a second metal that is merely placed adjacent the reacting intermediate product.

It is also an object of this invention to provide a method for producing from such a first-stage intermediate product an end product that is the metal from the metal halide used to make the intermediate product and a second metal that is merely placed adjacent the reacting intermediate product and said end product contains carbon.

It is also an object of this invention to provide a method for producing from such a first-stage intermediate product an end product that is an oxide of the metal from the metal halide used to make the intermediate product and an oxide of a second metal that is merely placed adjacent the reacting intermediate product and said end product contains carbon.

It is also an object of this invention to provide a method to produce such a first-stage intermediate product specifically containing zinc, copper, aluminum, a mixture of copper and palladium, and mixtures thereof.

It is also an object of this invention to provide a method to produce, through the use of such a first-stage intermediate product amorphous aluminum oxide fibers.

It is also an object of this invention to provide a method to produce, through the use of such a first-stage intermediate product crystalline aluminum oxide fibers.

It is also an object of this invention to provide a method to produce, through the use of such a first-stage intermediate product carbonaceous fibers containing FeO and $Fe_3O_4$, but no $Fe_2O_3$.

It is also an object of this invention to provide a method to produce, through the use of such a first-stage intermediate product carbonaceous fiber containing $Fe_3O_4$, which fiber is attracted to a magnet.

It is also an object of this invention to provide a method to produce, through the use of such a first-stage intermediate product carbonaceous fibers containing elemental iron crystals.

It is also an object of this invention to provide a method to produce, through the use of such a first-stage intermediate product carbonaceous fibers containing elemental iron crystals having an iron:carbon ratio of approximately 1:4, which fiber is attracted to a magnet.

It is also an object of this invention to provide a method to produce, through the use of such a first-stage intermediate product, fibers of metallic iron.

It is also an object of this invention to provide a method to produce, through the use of such a first-stage intermediate product, carbon fibers containing a nickel-iron alloy.

BRIEF DESCRIPTION OF THE FIGURES

The following figures are incorporated to help in understanding the features of the present invention.

DETAILED DESCRIPTION OF THE BEST MODE

Figure 1:
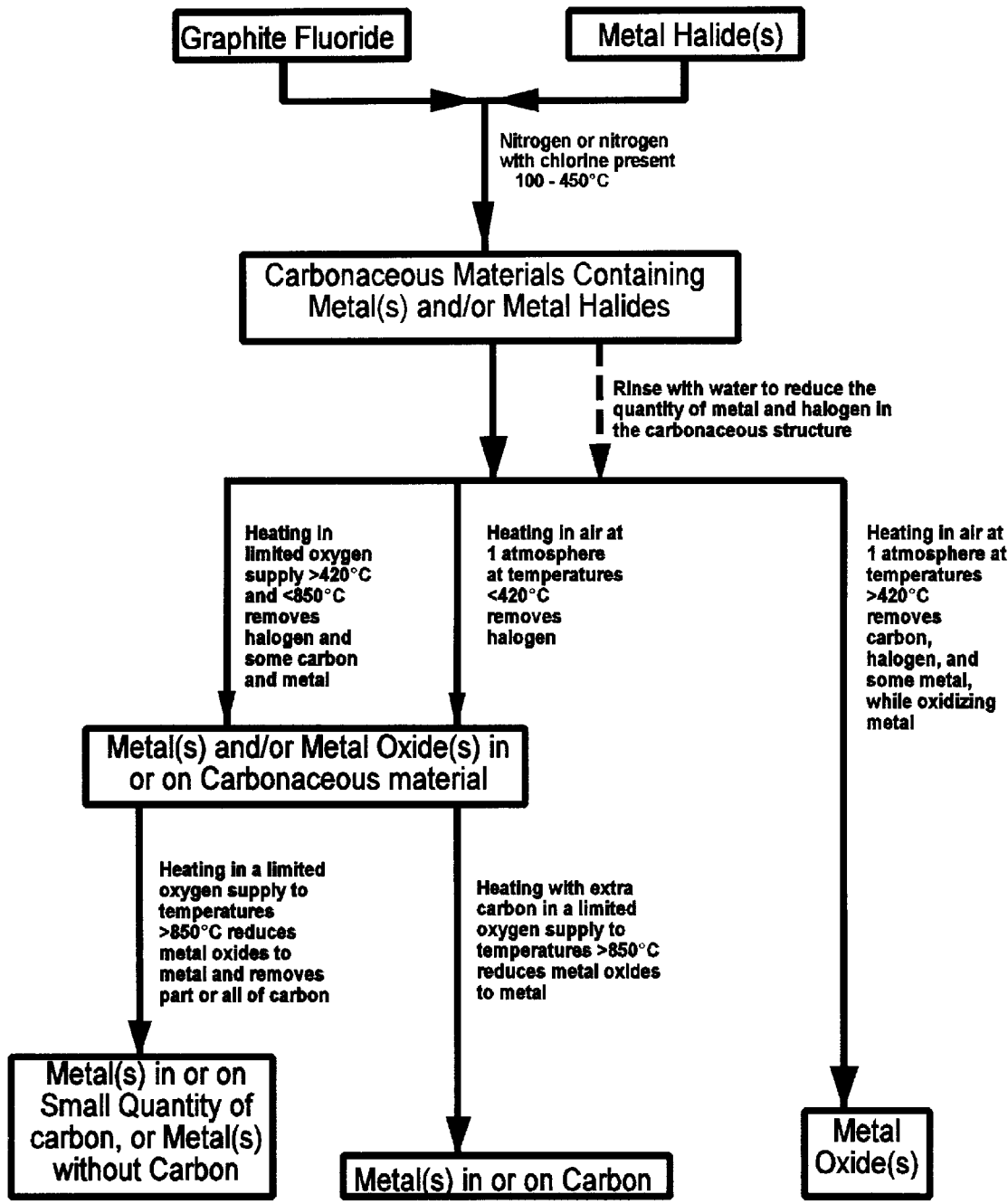
FIG. 1 illustrates in a block diagram the process steps of this disclosure.

The process of this invention can best be understood by reference to FIG. 1.

Graphite fluoride ($CF_x$) in direct contact with a metal halide ($MX_n$) or a mixture of a group of metal halides is heated in an inert atmosphere (e.g., nitrogen or a noble gas, such as helium or argon should all be suitable), an inert gas atmosphere with chlorine present, or in a chlorine atmosphere to a temperature of 100°–450° C. (degrees Celsius). Temperature history affects the process and the products. The optimum temperature or temperature history for this first step reaction depends upon the particular halide(s) being used. Specific details of this process are taught herein by including an abundance of examples. The majority of fluorine is removed from carbon in $CF_x$ during this reaction. The products from this first step process are carbonaceous products that do not exhibit X-ray diffraction patterns characteristic of the inter-laminar spacing of graphite, so they are considered non-graphitic. The crystal structure of each is believed to be laminar, but not uniformly spaced, thereby creating a broad, flattened peak in the region in which graphite would show a sharp peak. Evidence suggests metal fluoride and/or low purity metal has entered the crystal structure between the laminae, but this first-step product should not be called an intercalated graphite product.

When the $CF_x$ used as a reactant has been made from a fibrous graphitized carbon, the product of this first-step reaction may have a very high concentration of many different kinds of metal and halogen atoms, causing the carbon's structure to be under great stress. This stress reduces the tensile strength of the fiber, an undesirable result. Simply washing these fibers with water has, in some cases, been found to ameliorate this problem, apparently by selectively removing some metal and halogen atoms.

EXAMPLE 1

Dusting $ZnCl_2$ powder onto $CF_{0.68}$ fibers and heating this system at 310° C. for 7 hours caused the $CF_{0.68}$ to defluorinate. X-ray diffraction (XRD) data revealed that the product of this reaction contained $ZnF_2$ crystals. Examining the energy dispersive spectrum (EDS) of the sample, however, indicated the presence of some chlorine atoms, also. This product was subsequently heated with additional $ZnCl_2$ in nitrogen for 5 hours at 400° C., then rinsed in cold water; the product displayed XRD results characteristics of graphite and contained no $ZnF_2$ (by XRD analysis). EDS showed that some zinc and chlorine were still present. The empirical formula of this product sample appears to be approximately $C_{36}ZnCl_2$, indicated by EDS studies. It should be pointed out that the electron beam used to generate EDS results is capable of penetrating a sample only to a depth of about 2 $\mu$m (i.e., $2 \times 10^{-6}$ meters). Thus, the EDS data used to estimate some of the empirical formulas in this disclosure comes from only this 2-$\mu$m-thick outer layer of the sample.

EXAMPLE 2

The experiment described in Example 1 was repeated, except that $CuCl_2$ was used instead of $ZnCl_2$. $CuCl_2$ will release chlorine gas upon heating. Exposing $CF_{0.68}$ fibers and $CuCl_2$ to a temperature of 310° C. for 30 hours in an environment that contained chlorine gas and nitrogen, resulted in a fiber product that contained $CuF_2$. Analysis also showed the product to be partially intercalated with $CuCl_2$ (stages 1 and 6, low mixed-stage XRD peaks). The empirical formula of this product sample was estimated from EDS data to be $CF_{0.5}Cu_{0.2}Cl_{0.65}$. After further reaction at 390° C. in the same environment for an additional 2 hours, the product had high XRD peaks indicative of a mixed 1st- and 6th-stage $CuCl_2$ intercalated graphite compound. The electrical conductivity of this product was approximately twice that of the pristine carbon from which the $CF_{0.68}$ reactant was made. After rinsing, the product lost the majority of fluorine and the intercalation-indicating XRD peaks were no longer present. Yet this product retained a very high concentration of copper. The empirical formula of this product sample appears (from EDS data) to be approximately $CO_{0.125}CU_{0.15}Cl_{0.5}$.

EXAMPLE 3

Dusting $CuCl_2$ powder on $CF_{0.68}$ fibers and heating this system to 390° C. for 2 hours resulted in a product containing $CuF_2$ in carbon and a stage 2 $CuCl_2$-graphite intercalation compound.

Samples of the intermediate products, comprising carbon that contains metal halides or, in the special case of palladium, contains pure metals, were then heated in several different experiments. Depending upon the heating temperature, the heating duration, and the oxygen partial pressure to which the intermediate product is exposed, heating results in different products. This result is described as follows:

The intermediate product is exposed to air at a temperature of at least 420° C. The oxidation reaction is allowed to continue until all carbon and halogens are removed, resulting in pure metal oxide as a product.

EXAMPLE 4

$CF_{0.68}$ fibers were exposed to $AlCl_3$ vapors at 125° C. for 10 hours, followed by 190° C. for 15 hours, cooled, then rinsed in cold water. The defluorination was not complete in this case, but a vary large quantity of aluminum entered the fiber sample. The empirical formula for the product was approximately $C_3AlF_{0.5}Cl_{0.5}$. Heating the non-rinsed product in air at 500° C. for two weeks resulted in amorphous $Al_2O_3$ fibers. Heating the non-rinsed product in air at 1000° C. resulted in crystalline $Al_2O_3$ fibers.

The intermediate product is exposed to air at a temperature of up to 420° C. The oxidation of the metal at these temperatures is much faster than the oxidation of carbon. Therefore, halogens in metal halides can be replaced by oxygen to obtain a product of metal oxides in or on carbon fibers. The metal oxides, in general, have a much higher boiling point than do the metal halides, so the oxides may subsequently be reduced to elemental metal or alloys of metals by high-temperature treatment in a reducing environment without significant evaporative loss of the reactants. Thus, the final product is a metal or a metal alloy in carbon fibers. One way to generate such a reducing environment is to supply a surplus of carbon that will be oxidized by oxygen to form carbon monoxide (CO), a reducing gas.

EXAMPLE 5

$CF_{0.75}$ fibers made from graphitized carbon fibers were exposed to $FeCl_3$ vapor at 285° C. for 10 hours, nitrogen at 350° C. for 10 hours, and then air at 250° C. for 8 hours. The product was $Fe_2O_3$ in and on carbon fibers. This product was then placed on a quartz substrate, covered with non-graphitized carbon fibers made from a poly-acrylonitrile (PAN) precursor, then heated to 1100° C. for 1 hour in an environment wherein the oxygen partial pressure was estimated to be between $10^{-4}$ atmospheres and 0.02 atmospheres. The final product was iron in carbon fibers (based upon XRD data), it was attracted to a magnet, and has an iron:carbon ratio of approximately 1:4. In estimating this ratio, the weight of iron in a sample was determined by heating the product in air at 500° C. for 4 days (thereby oxidizing both the carbon and the iron), weighing the resulting oxide as $Fe_2O_3$, and calculating the iron content as 70% of the oxide.

The intermediate product is heated in an atmosphere having reduced oxygen partial pressure (below 0.02 atmosphere) and at a temperature up to 850° C. This condition is similar to that described in the previous paragraph, except that, when the temperature is significantly higher than 420° C., the carbon oxidation rate begins to become more significant relative to the oxidation rate of the metal halide. Also, under these conditions, some metal halide may be evaporated before its oxidation reaction can occur. But, because of the reduced partial pressure of oxygen, oxidation is at a slower rate and can be less complete, so the metal can be oxidized to a lower oxidation state. Therefore, the oxidation reaction is easier to control. The product in this case is metal oxide or oxides in or on carbon fibers.

Within the specified range for oxygen partial pressure cited here, higher partial pressure will result in less metal halide evaporation, but greater carbon loss.

EXAMPLE 6

$CF_{0.68}$ fiber sample was treated with saturated $FeCl_3$ vapor at 285° C. for 28 hours, then post-heated in nitrogen at 330° C. for 22 minutes. The product was then treated with oxygen at a low partial pressure (between $10^{-4}$ and 0.02 atm.) at 850° C. for 1 hour, producing FeO and $Fe_3O_4$, but no $Fe_2O_3$, in or on carbon fibers (determined by analyzing both XRD and EDS data).

The metal oxides formed in carbon, as described in the previous two examples, can be subsequently reduced to metal or alloy in a reducing environment at higher temperature (i.e., greater than 850° C.). The reduction can be conducted by using carbon monoxide (CO), which may be produced by oxidation of the carbon fibers containing the metal oxides being reduced—if a high metal:carbon ratio is desired—or by oxidation of extra or added carbon, to protect the fibers containing the metal oxides. The latter process was described above, in Example 5 and it appears useful when structural damage to the carbon fibers is undesirable.

Thus, this is a process that provides for the simultaneous reduction of metal oxides and oxidation of carbon. The final product is a metal or metal alloy in carbon fibers. By employing proper control, the reaction can be continued until all of the carbon is oxidized, leaving the metal or metal alloy without the carbon.

EXAMPLE 7

A $CF_{0.68}$ fiber sample was treated with saturated $FeCl_3$ vapor for 28 hours at 285° C., then post-heated in nitrogen for 22 minutes at 330° C. The resulting product was then heated with oxygen at low partial pressure (between $10^{-4}$ atm. to 0.02 atm.). The temperature was gradually increased from room temperature to 800° C. over a period of 3 hours, then raised to 900° C. and held for 3 hours. The final product of this process is metallic iron in or on carbon fibers (determined by analysis of XRD and EDS data). The 900° C., low oxygen environment allowed the carbon fiber to produce CO, which reduced the $Fe_3O_4$ to pure iron metal in the carbon fibers.

EXAMPLE 8

A $CF_{0.68}$ fiber sample was treated with saturated $FeCl_3$ vapor for 28 hours at 285° C., then post-heated in nitrogen for 22 minutes at 330° C. The resulting product was then treated with oxygen at low partial pressure (between $10^{31\ 4}$ atm. to 0.02 atm.). The temperature for this reaction was increased from room temperature to 1,200° C. and held for 40 minutes. More than 50% of the resulting fiber product had a shiny white appearance. Analysis revealed the white material to be elemental iron. A photomicrograph of this product is presented in FIG. 2.

Figure 2:
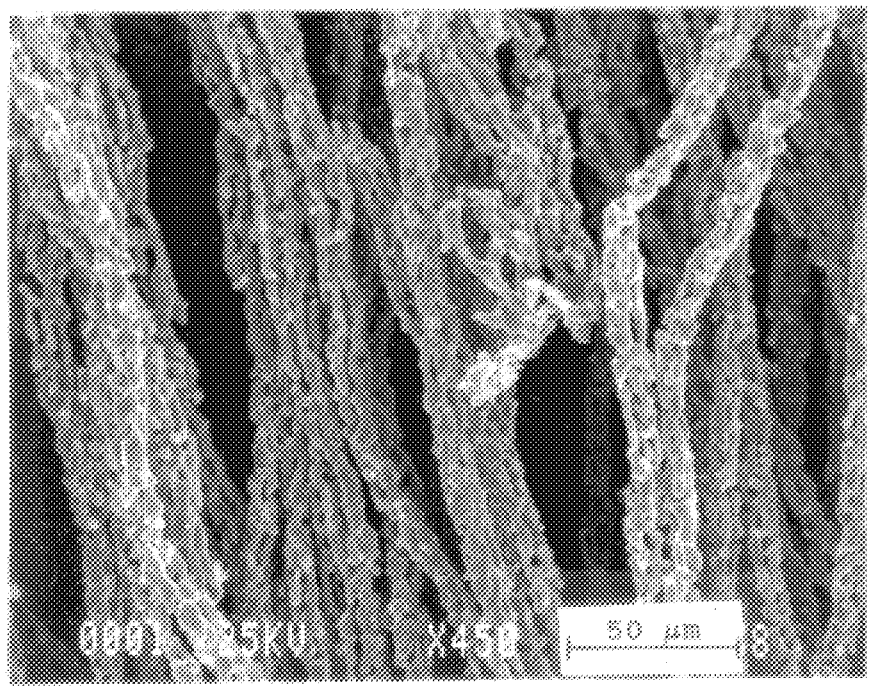
FIG. 2 is a photomicrograph showing one of the unique products from one process of this disclosure.

What FIG. 2 shows is the chain-like skeleton—strands having through-passages penetrating their thickness—of what appears to be elemental iron that was formed as carbon on which it had been deposited was oxidized away. To be sure, these structures are not made up of closed links as is a chain that might be described as a jointed linked product; rather, the product fibers each have a fixed elongated, porous structure. One would expect such a structure to have a high surface area, per unit weight, which would make it an excellent structure for use as a catalyst for reactions that the metal would catalyze. If a stronger structure were required, the reaction that oxidizes away the carbon could be controlled so the carbon is not totally eliminated.

Immediately after the reaction between $CF_x$ and metal halide(s), the product may be heated in a nitrogen environment to vaporize any metal halide(s) on the surface. This step is, however, optional.

The entire process disclosed herein—or any part thereof—can be performed with additional metal or metal oxides present adjacent to (and in the same environment with) the carbon materials. In this case, the additional metal elements or compounds are transported to the carbon material and form a metal or metal alloy on or in the carbon.

EXAMPLE 9

A sample of $CF_{0.75}$ fibers made from graphitized carbon fibers was exposed sequentially to $FeCl_3$ vapor at 285° C. for 7 hours and nitrogen at 350° C. for 10 hours. It was then placed on a nickel foil and heated to 1100° C. in a reduced-oxygen environment (oxygen partial pressure was at a value between $10^{-4}$ atm. and 0.02 atm.). The final product contains both nickel and a nickel-iron alloy (indicated by XRD and EDS data).

The process to reduce metal oxide(s) to their respective metal can be effected in an inert environment, in which case the oxide is reduced at high temperature by the carbon present. The carbon host (or substrate) need not be in the form of fibers.

EXAMPLE 10

A samples of a commercially-purchased $CF_{0.7}$ powder was treated with $FeCl_3$ at about 300° C. and then at about 380° C. for 80- and 45 minutes, respectively. The resulting product was then mixed with NiO, placed in a quartz tube and heated to 1200° C. for 45 minutes with oxygen present at a low partial pressure (oxygen partial pressure was at a value between $10^{-4}$ atm. and 0.02 atm.). This process resulted in a mixture of elemental nickel and nickel-iron alloy on carbon powder (determined by analyzing both XRD and EDS data).

In Some cases, the metal halide does not easily react with oxygen; rather, it decomposed directly to metal. However, using the above-disclosed process resulted in the same final product.

EXAMPLE 11

A sample of $CF_{0.68}$ fibers was dusted with both $CuCl_2$ powder and $PdCl_2$ powder. The sample was then heated to 310° C. for 40 hours and 370° C. for 10 hours. The fibers reacted with both chlorides in an environment of $Cl_2$ and $N_2$. The product was rinsed in cold water. XRD data showed the rinsed product to contain palladium. EDS data showed the presence of copper and chlorine atoms, also. Subsequent heating at 1100° C. for 1 hour in oxygen at a partial pressure between $10^{31\ 4}$ atm. and 0.02 atm. produced an end product for which the empirical formula was estimated from EDS data to be $C_5PdCu_{0.15}Cl_{0.1}$. XRD data show the diffraction peak very close to the that reported in the literature for elemental palladium, thus indicating the palladium was nearly pure. These data are presented in Table I. The XRD data also show the two highest peaks for $Cu_3Pd$.

EXAMPLE 12

Example 11 was repeated, except that only $PdCl_2$ was used, with no $CuCl_2$. In this experiment, no reaction between the $PdCl_2$ and the $CF_{0.68}$ could be detected.

TABLE I

X-Ray Diffraction Peaks for Palladium in Carbon at Different Stages of the Reactions Described in Example 11.

| Immediately after reactions to 370° C. with $PdCl_2$—$CuCl_2$ mixture | | Immediately after 800° C. heating in an environment of limited oxygen supply | | Immediately after 1100° C. heating in an environment of limited oxygen supply | | Pure palladium (reference) | |
|---|---|---|---|---|---|---|---|
| D | $I/I_o$ | D | $I/I_o$ | D | $I/I_o$ | D | $I/I_o$ |
| 2.242 | 100 | 2.196 | 100 | 2.223 | 100 | 2.246 | 100 |
| 1.940 | 31 | 1.906 | 28 | 1.923 | 36 | 1.945 | 42 |
| 1.371 | 14 | 1.349 | 8 | 1.362 | 18 | 1.376 | 25 |
| — | — | 1.150 | 6 | 1.161 | 13 | 1.173 | 24 |

From the examples herein presented, one can see that a key element in the processes here taught is the production of the first-stage intermediate product that places metal atoms along with halogen atoms within the structure of carbon, usually carbon fibers, but carbon powder has been used. This first-stage intermediate is believed to be key to the subsequent processes that ultimately produce metal oxides of one or more metals either on or in a carbon structure or with the carbon oxidized away or elemental metals either on or in a carbon structure or with the carbon oxidized away. Wherein carbon fibers are the starting material for the graphite fluorides used herein, the end products remain fibrous in basic structure with unusual microstructure including metals and/or their oxides, with or without carbon, and they may have uses now unforeseen. The anticipated uses have been mentioned above. Wherein carbon powder is the starting material for the graphite fluorides used herein, the end products remain powdered in basic structure and likewise has similar unusual microstructure. Such products will find application in areas wherein the unique combination of carbon and metal or metal oxides in intimate contact is needed. They will also be useful in products and processes wherein a metal or metal oxide having a porous particulate structure is desired. Catalysts come immediately to mind, but other uses will likely become obvious to those in search of such materials as are here described.

I claim:

1. A method of making chemically-modified carbon-based materials from a precursor containing graphite fluoride, said method comprising:

exposing graphite fluoride to a halide of a first metal, said halide being a compound of only said first metal and a halogen, in an atmosphere composed of a gas selected from the group consisting of noble gas, chlorine, nitrogen, nitrogen-chlorine mixture, and noble gas-chlorine mixture, said exposure being at a temperature between approximately 100° C. and approximately 450° C., for sufficient time to effect substantially complete defluorination of said graphite fluoride while also permitting said halide to enter into and alter the laminar crystal structure of said graphite fluoride, thereby resulting in a carbonaceous material appearing to be non-graphitic by X-ray diffraction standards, in that the X-ray spectrograph of the product shows no sharp peak at a position that would indicate a crystal lattice spacing at or around 3.375 Angstrom units that represents the 002 lattice spacing of graphite, and containing said first metal and said halogen.

2. The method of claim 1 further comprising:

after the previous steps, rinsing in water the said carbonaceous material containing said first metal and said halogen, thus selectively removing some atoms of said first metal and some atoms of said halogen from said carbonaceous material, thereby reducing stress within the crystal structure of said carbonaceous material.

3. The method of claim 1 further comprising:

after the previous steps, exposing said carbonaceous material to air at atmospheric pressure and a temperature of at least 420° C., for sufficient time to remove by oxidation of all carbon and halogen from said carbonaceous material, resulting in at least one oxide of said first metal.

4. The method of claim 1 further comprising:

after the previous steps, exposing said carbonaceous material to air at atmospheric pressure and an elevated temperature below 420° C., for sufficient time to remove by oxidation substantially all said halogen but substantially no carbon from said carbonaceous material, resulting in a carbonaceous material containing an oxide of said first metal.

5. The method of claim 1 further comprising:

after the previous steps, exposing said carbonaceous material to oxygen at a partial pressure between $10^{-4}$ atmospheres and 0.02 atmospheres and at temperature above approximately 420° C. and up to approximately 850° C., for sufficient time to remove by oxidation substantially all halogen and some carbon from said carbonaceous material, resulting in a carbonaceous material containing an oxide of said first metal.

6. The method of claim 4 further comprising:

after the previous steps, exposing said carbonaceous material to a chemically reducing carbon monoxide atmosphere while heating to a temperature of at least 850° C. for sufficient time for said carbon monoxide to convert to metal substantially all said oxide of said first metal present by a reduction reaction, resulting in a carbonaceous material containing said first metal in elemental form.

7. The method of claim 5 further comprising:

after the previous steps, exposing said carbonaceous material to a chemically reducing carbon monoxide atmosphere while heating to a temperature of at least 850° C. for sufficient time for said carbon monoxide to convert to metal substantially all said oxide of said first metal present by a reduction reaction, resulting in a carbonaceous material containing said first metal in elemental form.

8. The method of claim 4 further comprising:

after the previous steps, exposing said carbonaceous material containing an oxide of said first metal to oxygen at a partial pressure between $10^{-4}$ atmospheres and 0.02 atmospheres and at a temperature above approximately 850° C., so that carbon present in said carbonaceous material is oxidized to carbon monoxide, thus creating a reducing atmosphere immediately adjacent said oxide of said first metal, said reducing atmosphere effecting a reducing to metal of substantially all said oxide of said first metal present, resulting in a product material containing said first metal in elemental form; said oxidation reaction that generates said carbon monoxide may consume a significant fraction of said carbon in said carbonaceous material, even all of it.

9. The method of claim 5 further comprising:

after the previous steps, exposing said carbonaceous material containing an oxide of said first metal to oxygen at a partial pressure between $10^{-4}$ atmospheres and 0.02 atmospheres and at a temperature above approximately 850° C., so that carbon present in said carbonaceous material is oxidized to carbon monoxide, thus creating a reducing atmosphere immediately adjacent said oxide of said first metal, said reducing atmosphere effecting a reducing to metal of substantially all said oxide of said first metal present, resulting in a product material containing said first metal in elemental form; said oxidation reaction that generates said carbon monoxide may consume a significant fraction of said carbon in said carbonaceous material, even all of it.

10. The method as described in claims 3, 4, 5, 6, 7, 8, or 9, further comprising a step wherein a second metal in a chemical form selected from the group consisting of elemental metal and metal oxide is placed adjacent said carbonaceous materials during at least one step in the process, thereby permitting a plurality of atoms of said second metal to migrate to the carbonaceous material, resulting in a product that comprises atoms of said second metal and atoms of said first metal.

11. The method of claim 1 wherein said metal halide is selected from the group consisting of $ZnCl_2$, $CuCl_2$, $AlCl_3$, a mixture of $CuCl_2$ and $PdCl_2$, and mixtures thereof.

12. The method of claim 2 wherein said metal halide is selected from the group consisting of $ZnCl_2$, $CuCl_2$, $AlCl_3$, $FeCl_3$, a mixture of $CuCl_2$ and $PdCl_2$, and mixtures thereof.

13. The method of claim 3 wherein said metal halide is $AlCl_3$.

14. The method of claim 1 wherein:

said graphite fluoride is $CF_{0.68}$ fiber, said halide of a first metal is $FeCl_3$ vapor, said atmosphere is nitrogen, and said temperature is approximately 285° C.;

and further comprising, after the previous steps:

removing said $FeCl_3$ and heating said carbonaceous material in nitrogen at approximately 330° C., then introducing oxygen at a partial pressure in the range of $10^{-4}$ to 0.02 atmospheres and heating to 850° C.;

whereby a carbonaceous fiber product is obtained that contains FeO and $Fe_3O_4$, but no $Fe_2O_3$.

15. The method of claim 1 wherein:

said graphite fluoride is $CF_{0.75}$ fiber, said halide of a first metal is $FeCl_3$ vapor, said atmosphere is nitrogen, and said temperature is approximately 285° C.;

and further comprising, after the previous steps:

removing said $FeCl_3$ vapor and heating said carbonaceous material to a temperature of approximately 350° C. in a nitrogen atmosphere, then introducing air at one atmosphere and maintaining a temperature of approximately 250° C., followed by heating the resulting material to approximately 1100° C. in the presence of quartz and non-graphitized carbon fibers from a PAN precursor in an atmosphere containing oxygen at a partial pressure in the range of $10^{-4}$ to 0.02 atmospheres, whereby a carbonaceous fiber product is obtained that contains elemental iron crystals.

16. The method of claim 4 wherein:

said graphite fluoride is $CF_{0.68}$ fiber, said halide of a first metal is $FeCl_3$ vapor, said atmosphere is nitrogen, and said temperature is 285° C.;

and further comprising, after the previous steps:

heating said carbonaceous material containing an oxide of said first metal to a temperature of approximately 330° C., then introducing oxygen at a partial pressure in the range of $10^{-4}$ to 0.02 atmospheres and heating to approximately 800° C. during a 3-hour period, then increasing rapidly to 900° C. for approximately 3 hours.

17. The method of claim 1 wherein:

said graphite fluoride is $CF_{0.68}$ fiber, said halide of a first metal is $FeCl_3$ in the form of saturated vapors, said atmosphere is nitrogen, said exposure to said FeCl$_3$ is at a temperature of approximately 285° C. for approximately 28 hours;

and further comprising, after the previous steps:
  removing said FeCl$_3$ vapor and heating said carbonaceous material to a temperature of 330° C. in said nitrogen atmosphere for approximately 22 minutes; then introducing oxygen at a partial pressure of between 10$^{-4}$ and 0.02 atmospheres and at a temperature rising from room temperature to 1200° C. and held at 1200° C. for a period of approximately 40 minutes.

18. The method of claim 1 wherein:

said graphite fluoride is CF$_{0.75}$ fiber, said halide of a first metal is FeCl$_3$ in the form of saturated FeCl$_3$ vapors at 285° C. for approximately 7 hours;

and further comprising after the previous steps:
  exposure of the resulting said carbonaceous materials to nitrogen, at 350° C. for approximately 10 hours; then
  introducing oxygen at a partial pressure of between 10$^{-4}$ and 0.02 atmospheres and heating said carbonaceous material to a temperature of 1100° C. in the presence of metallic nickel.

19. The method of claim 1 wherein:

said graphite fluoride is CF$_{0.7}$ powder, said halide of a first metal is FeCl$_3$ as saturated vapors at a first temperature of approximately 300° C. for approximately 80 minutes followed by exposure to saturated FeCl$_3$ vapors at approximately 380° C. for approximately 45 minutes;

and further comprising after the previous steps:
  mixing said carbonaceous material with NiO powder at room temperature;
  introducing to the resulting mixture oxygen at a partial pressure of between 10$^{-4}$ and 0.02 atmospheres and heating it to a temperature of 1200° C.

20. The method of claim 1 wherein:

said graphite fluoride is CF$_{0.68}$ fiber, said halide of a first metal is CuCl$_2$ powder and a halide of a second metal present is PdCl$_2$ powder, said atmosphere is a mixture of Cl$_2$ and N$_2$ at a temperature of 310° C. for a period of approximately 40 hours, then at 370° C. for a period of approximately 10 hours;

rinsing in water the said carbonaceous material containing said first metal and said halogen, thus selectively removing some atoms of said first metal and some atoms of said halogen from said carbonaceous material, thereby reducing stress within the crystal structure of said carbonaceous material;

said method further comprising:
  introducing oxygen at a partial pressure of between 10$^{-4}$ and 0.02 atmospheres and heating to a temperature of 1100° C. for approximately one hour.

* * * * *